Jan. 15, 1929.
B. H. ABRAHAMSON
AUTOMOBILE TOOL
Filed Feb. 7, 1928
1,699,039
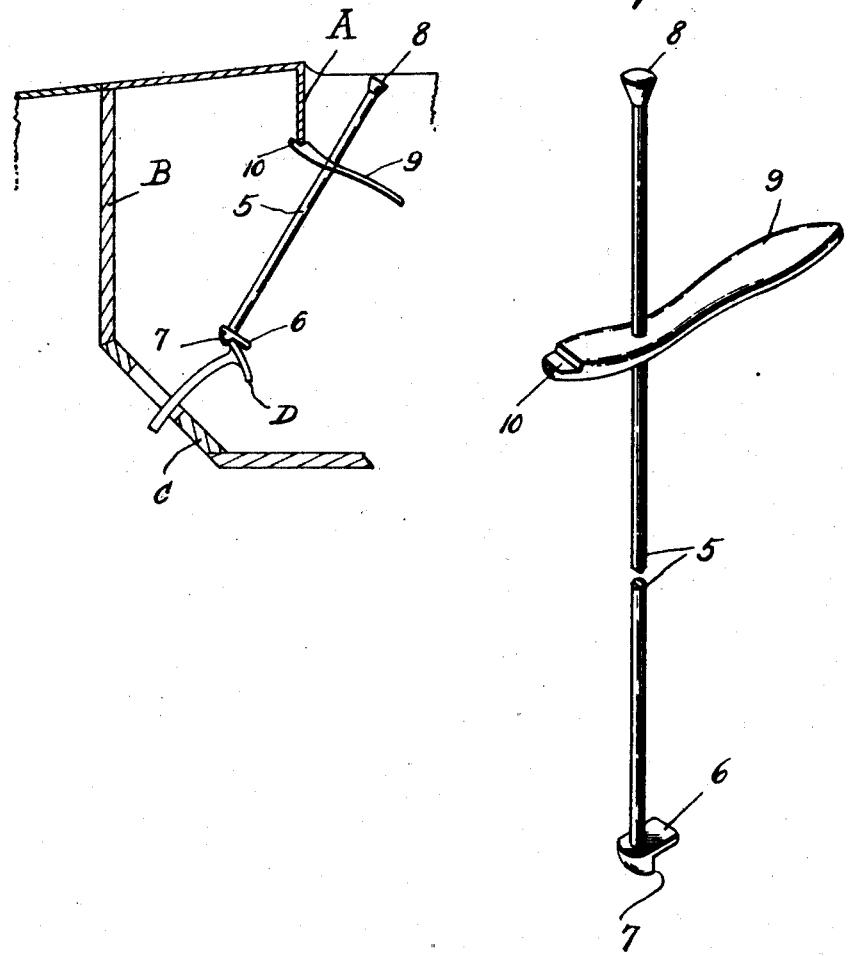
Inventor
Bernhard H. Abrahamson
By Clarence A. O'Brien
Attorney Patented Jan. 15, 1929.

1,699,039

UNITED STATES PATENT OFFICE.

BERNHARD H. ABRAHAMSON, OF JAMESTOWN, NEW YORK.

AUTOMOBILE TOOL.

Application filed February 7, 1928. Serial No. 252,496.

This invention relates to new and useful improvements in automobile tools and aims to provide a highly novel, simple and extremely inexpensive tool whereby the foot brake pedal or clutch pedal of the machine may be maintained in partially or totally depressed condition for facilitating the adjustment of the brake or of the clutch or to facilitate the installation of signal switches operable by the depression of the clutch or brake pedal.

Furthermore the invention aims to provide a tool of this character wherein the pedal may be depressed by the tool, and wherein the pedal may be retained at any predetermined point by a quick acting adjustment member.

In the drawing wherein like reference characters indicate corresponding parts in both of the views thereof:

Figure 1 is a fragmentary section through the body of an automobile directly forwardly of the driver's seat, the pedal disclosed being maintained in partially depressed position by means of the present invention, and Figure 2 is a perspective view of the tool per se.

Now having particular reference to the drawing, there is disclosed in Figure 1 in fragmentary manner certain portions of an automobile body such as the instrument board A, the dash board B, and the toe board C through slots within which are movable the foot, brake, and clutch pedals, one of which is shown designated by the reference characters D. My invention per se consists of a solid metallic bar 5 of predetermined length, and preferably of circular shape in cross section, one end of the bar being provided with a foot piece 6 at the inner end of which is formed a shoulder 7, the opposite end of said bar being equipped with a rubber or other suitable material bumper 8.

Slidable upon the bar 5 is a tongue member 9 of predetermined length, one end thereof being shaped to provide a manipulating handle for the tongue while the inner end thereof is formed at its top surface with a transverse notch 10. The opening within this tongue is but slightly greater than the diameter of the bar so that when the tongue is canted to a slight degree there will be a frictional lock between the tongue and the bar to prevent the sliding of the tongue upon the bar.

In actual use, the foot piece 6 is engaged at the inner edge of the foot plate of the pedal D, the shoulder 7 overlapping said inner edge of the foot plate after which the pedal is depressed to the desired degree by pushing downwardly upon the bar 5. Prior to this action the tongue 9 is slid downwardly upon the bar so that the inner end thereof is arranged beneath the lower edge of the body instrument board A. After the desired depression of the pedal has been brought about, the tongue is slid upwardly until the notch 10 of the tongue engages the lower edge of the instrument board whereupon the pressure of the pedal spring, not disclosed, will force the pedal firmly against the bar, causing the canting of the tongue and its locking of the same to the bar whereupon the said pedal is positively retained in its depressed condition.

It will thus be seen that I have provided a highly novel, simple and extremely useful automobile tool that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new is:

1. In means for retaining a foot pedal of an automobile in depressed position, a bar of predetermined length, means at one end of the bar for engaging the foot portion of the pedal, and means slidable upon the bar for engagement with a stationary portion of the automobile after the pedal has been depressed, said means adapted to bind upon the bar when pressure is exerted thereagainst at one end.

2. In means for retaining a foot pedal of an automobile in depressed position, a bar of predetermined length, means at one end of the bar for engaging the foot portion of the pedal, means slidable upon the bar for engagement with a stationary portion of the automobile after the pedal has been depressed, said means adapted to bind upon the bar when pressure is exerted thereagainst at one end, means consisting of a tongue of predetermined length having an opening slightly larger than the diameter of the bar so that when the tongue is arranged horizontally the same may freely slide upon the bar, but when canted will grip the bar.

In testimony whereof I affix my signature.

BERNHARD H. ABRAHAMSON.